Patented Mar. 15, 1938

2,110,974

UNITED STATES PATENT OFFICE 2,110,974

METHOD OF TREATING MAGNETIC MATERIALS

Randall Gillis, La Grange, Ill., assignor to Western Electric Company, Incorporated, New York, N. Y., a corporation of New York No Drawing. Application January 10, 1934, Serial No. 706,665

9 Claims. (Cl. 175—21)

This invention relates to methods of treating magnetic materials and more particularly to methods for treating nickel iron alloys in the process of making magnetic cores.

An object of the invention is to provide methods for increasing the efficiency of magnetic material.

In accordance with one embodiment of the invention, finely divided magnetic material is heat treated in the presence of a carburizing agent and after the treated material is insulated and compressed into cores, the cores are subjected to a second heat treatment in the presence of a carburizing agent, whereby the hysteresis and eddy current losses of the cores are greatly reduced.

In carrying out the present invention, the magnetic material is preferably prepared from brittle alloys containing various percentages of nickel and iron. These alloys may be prepared as fully described in the patent to C. P. Beath and H. M. E. Heinicke, No. 1,669,649, issued May 15, 1928.

An alloy thus prepared is rolled while hot into relatively thin slabs and quenched to produce a fine crystalline structure, which is very desirable since the disintegration of the material takes place at the crystal boundaries and consequently the smaller the size of the crystals, the finer the dust which can be produced from the finished product. The magnetic alloy thus received in slab form is reduced to a finely divided form or dust, in any well known manner, as for example, in a hammer mill or other suitable reducing apparatus and subsequently pulverized in an attrition mill.

The dust from the attrition mill is sifted and the portion passing through a 120 mesh sieve is mixed with .75 per cent kaolin. The purpose of mixing the kaolin with the dust is to prevent the dust from sintering into a solid mass during the subsequent annealing treatment and the kaolin may remain in the dust to later form an ingredient of the insulating composition as will be more fully described hereinafter. The mixed dust and kaolin is then placed in a container and a carburizing agent, such as a charcoal compound or charred bone, is added. The carburizing agent may be mixed together with the magnetic dust particles although preferably it is placed in a perforated cylinder and buried in the dust. This eliminates the necessity of later screening it from the magnetic particles. It has been found that approximately 1 per cent of charred bone is the optimum quantity to be used of this material since the addition of 2 per cent produces no better results than 1 per cent and when substantially less than 1 per cent of charred bone is used the hysteresis losses of the magnetic material are not reduced to the same extent as when one per cent is used. After the carburizing agent has been placed in the material, the container is sealed and the material is heated to a temperature of approximately 1400° F. for a period of 1½ hours. While it is not desired to be limited to any particular theory, it appears that the carburizing agent gives off a gas which tends to prevent oxidation of the magnetic material by combining with the oxygen in the container and between the particles and producing a higher than atmospheric pressure in the container to prevent ingress of air. It also appears to act as a purifier to remove impurities, such as combined oxygen and sulfur, from the magnetic material. The presence of the kaolin, which prevents the magnetic particles from sintering, allows the reducing atmosphere to effectively penetrate the magnetic dust. This treatment of the dust results in a reduction of 20 per cent or more in the hysteresis losses of core parts formed from the dust over parts made from uncarburized materials. The treatment with the carburizing material also increases the resistivity of parts made from carburized material resulting in lower eddy current losses.

The dust thus treated is then again pulverized to break up slightly adhering particles and passed through a 120 mesh screen. The dust passing through such a screen is insulated with a solution which may comprise tartaric acid 3 parts, sodium silicate 10.5 parts, powdered talcum 7.5 parts, kaolin 7.5 parts and water 120 parts. When the kaolin, which was used as an anti-sintering agent in annealing the magnetic dust particles, remains mixed with the dust the amount thereof may be deducted from the above quantity. The insulation may be applied as described more fully in the patent of C. C. Neighbors, 1,948,308 issued February 20, 1934, relating to a Method of making magnetic bodies. Obviously other methods of insulating the dust well known to the art could also be employed.

The insulated dust is sifted through a 16 mesh screen and placed in a mold and compressed into core parts under a pressure of approximately 200,000 pounds per square inch. Certain stresses are set up in the magnetic dust particles during the formation of the core parts under this high pressure and, therefore, it is desirable to anneal the core parts to improve the magnetic properties of the material. In annealing the core parts, the parts are placed in a sealed pot with a quantity of carburizing material, such as a charcoal compound or charred bone. The quantity of charred bone placed in the sealed container is not critical and preferably comprises from 1 to 2 per cent by weight of the cores placed in the container. The core parts are then heated to a temperature of approximately 1100° F. for a period of one hour. This appears to be the optimum temperature. Higher temperatures may be used although care must be taken not to raise the temperature so high as to burn out the insulating material. This second heat treatment of the magnetic material in the presence of a carburizing agent tends to further decrease the hysteresis and eddy current losses and improves the magnetic properties of the cores. The hysteresis losses of cores treated in a sealed container in the presence of a carburizing material have been found to be 13 per cent or more below those obtained with materials not treated in the presence of a carburizing material. It also appears that satisfactory insulation between the dust particles may be maintained at higher temperatures applied for longer periods than is possible without the presence of carburizing materials.

It will be understood that the nature and embodiments of the invention herein described are merely illustrative and that many changes and modifications may be made therein without departing from the spirit and scope of the invention.

What is claimed is:

1. A method of treating magnetic cores formed of insulated nickel iron dust which comprises heat treating the cores in the presence of a carburizing material.

2. A method of treating magnetic cores formed of insulated nickel iron dust which comprises heat treating the cores in the presence of a carburizing material in a sealed container.

3. A method of making magnetic nickel iron cores which comprises insulating magnetic dust particles, compressing the insulated particles into cores, and heat treating the cores in the presence of a carburizing material.

4. A method of making magnetic nickel iron cores which comprises insulating magnetic dust particles, compressing the insulated particles into cores, and heat treating the cores in the presence of a carburizing material in a sealed container.

5. A method of making magnetic nickel iron cores which comprises mixing finely divided magnetic material with a small amount of kaolin, heat treating the mixture in the presence of a carburizing material, insulating the annealed material, compressing the material into cores, and heat treating the cores in the presence of a carburizing material.

6. A method of treating finely divided magnetic nickel iron particles, which comprises mixing the particles with a material to prevent sintering, and heat treating the mixture in the presence of a carburizing material enclosed in a perforated container.

7. A method of treating finely divided magnetic nickel iron particles, which comprises mixing the particles with a material to prevent sintering, and heat treating the mixture in the presence of a carburizing material enclosed in a perforated container imbedded in the mixture.

8. A method of treating magnetic cores formed of insulated nickel iron dust, which comprises heat treating the cores at a temperature of the order of 1100° F. in the presence of a carburizing material.

9. A method of making magnetic cores of finely divided nickel iron material, which comprises heat treating the nickel iron particles at a temperature of the order of 1400° F. in the presence of a carburizing material, forming a core consisting mainly of the heat treated particles, and heat treating the core at a temperature of the order of 1100° F. in the presence of a carburizing material.

RANDALL GILLIS.